United States Patent
Kusumoto et al.

(10) Patent No.: US 9,197,459 B1
(45) Date of Patent: Nov. 24, 2015

(54) DECISION FEEDBACK EQUALIZER

(71) Applicant: DENSO CORPORATION, Kariya, Aichi-pref. (JP)

(72) Inventors: Tetsuya Kusumoto, Kariya (JP); Shigeki Ohtsuka, Kariya (JP); Nobuaki Matsudaira, Chiryu (JP); Hironobu Akita, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/710,724

(22) Filed: May 13, 2015

(30) Foreign Application Priority Data

May 14, 2014 (JP) ................................. 2014-100513

(51) Int. Cl.
    *H04L 25/03* (2006.01)
(52) U.S. Cl.
    CPC ... *H04L 25/03057* (2013.01); *H04L 2025/0349* (2013.01)
(58) Field of Classification Search
    CPC ................. H04L 25/03057; H04L 2025/0349; H04L 27/01
    See application file for complete search history.

(56) References Cited

U.S. PATENT DOCUMENTS

| | | | |
|---|---|---|---|
| 2001/0007479 A1* | 7/2001 | Kim ............................. | 348/614 |
| 2004/0146100 A1* | 7/2004 | Chang et al. .................. | 375/233 |
| 2005/0175081 A1* | 8/2005 | Zhidkov ........................ | 375/232 |
| 2005/0207485 A1* | 9/2005 | Lai ............................... | 375/233 |
| 2007/0121717 A1* | 5/2007 | Dong et al. .................... | 375/232 |
| 2007/0133670 A1* | 6/2007 | Kang et al. .................... | 375/232 |

FOREIGN PATENT DOCUMENTS

| | | |
|---|---|---|
| JP | 2001-177451 A | 6/2001 |
| WO | 2015/052879 A1 | 4/2015 |

OTHER PUBLICATIONS

Proakis, John G., "Digital Communication." Nov. 1999, pp. 752-753, Kagaku Gijutsu Shuppan, Inc., Japan (Partial English Translation).

* cited by examiner

*Primary Examiner* — Jean B Corrielus
(74) *Attorney, Agent, or Firm* — Posz Law Group, PLC

(57) ABSTRACT

In a decision feedback equalizer, at least one of weighting devices that has a tap coefficient an absolute value of which is relatively larger than absolute values of tap coefficients of other weighting devices is referred to as a main weighting device, and delay elements are disposed asymmetrically on signal processing paths or updating paths of the tap coefficients of the weighting devices in such a manner that an updating interval of the tap coefficient of the main weighting device is shorter than updating intervals of the tap coefficients of the other weighting devices.

5 Claims, 7 Drawing Sheets

DECISION FEEDBACK EQUALIZER

CROSS REFERENCE TO RELATED APPLICATIONS

The present application is based on and claims priority to Japanese Patent Application No. 2014-100513 filed on May 14, 2014, the disclosure of which is incorporated herein by reference.

TECHNICAL FIELD

The present disclosure relates to a decision feedback equalizer that performs a waveform equalization processing to an input signal.

BACKGROUND

In a device that receives a communication signal or a broadcasting signal, a decision feedback equalizer that performs a waveform equalization nonlinearly is widely used for reducing influence of an intersymbol interference in received signals. FIG. 7 illustrates a decision feedback equalizer 1 described in Non-patent Document 1 ("Digital Communication", John G. Proakis, Kagaku Gijutsu Shuppan, p752-753) and Patent Document 1 (JP 2001-177451 A). The decision feedback equalizer 1 includes a plurality of weighting devices 2a-2e. The weighting device 2a at a first stage directly receives an input signal (tap a), the weighting device 2b receives the input signal through a delay element 3a (tap b), and the weighting device 2c receives the input signal through the delay element 3a and a delay element 3b (tap c).

Each of the weighting devices 2a-2e includes two multipliers 4, 5 and an accumulator 6. The multiplier 4 multiply the input signal by a tap coefficient and outputs a multiplication result to the accumulator 6. The multiplier 5 multiplies the input signal by an output signal of the accumulator 6 and outputs a multiplication result to the outside. An adder 7 adds output results of the weighting devices 2a-2e and outputs an addition result to a detector 8. The detector 8 performs a symbol detection to the input signal and outputs a data value±1. In other words, the detector 8 outputs a non-return to zero (NRZ) signal.

The output signal of the detector 8 is input to the weighting device 2d through a delay element 3c (tap d), and is further input to the weighting device 2e through a delay element 3d (tap e). A subtractor 9 calculates a difference between the input signal and the output signal of the detector 8 and outputs the difference to a tap coefficient updating portion 10. The tap coefficient updating portion 10 updates the tap coefficient by multiplying the difference by an update coefficient $\Delta$ and outputs the updated tap coefficient to the multipliers 4 in the weighting devices 2a-2e. The weighting devices 2a-2c are feed forward (FF) side weighting devices, and the weighting devices 2d, 2e are feedback (FB) side weighting devices.

In general, in order to improve a convergence accuracy of a decision feedback equalizer, it is necessary to increase the number of taps so as to increase a resolution. However, when the decision feedback equalizer 1 having the above-described configuration is actually formed into an integrated circuit, it is necessary to consider timing of signals transmitted between elements. If the number of taps in the decision feedback equalizer is increased, the number of fan-out of the tap coefficient updating portion 10, which updates the tap coefficient of all of the weighting devices 2a-2e, increases, and an increase amount of a delay time becomes a value that is not negligible, for example, by influence of a stray capacitance. Thus, it is necessary to dispose a delay element between elements forming the decision feedback equalizer 1 so as to satisfy a timing limitation (or a driving ability).

In other words, as illustrated in FIG. 8, in each of the weighting devices 2a-2e in a decision feedback equalizer 14, delay elements 11a, 11b are disposed on an input side of the multiplier 4, and a delay element 11c is disposed on an output side of the multiplier 4. In addition, between each of the weighting devices 2a-2e and the adder 7, delay elements 12a-12e are disposed, and a delay element 13 is disposed on an output side of the adder 7.

In the decision feedback equalizer 14, delays of feedback paths of updating the tap coefficients are equal among the respective taps (the delay unit number "2"). In addition, the delay on the input side of the multiplier 4 is set to be equal to the delay of the feedback path. The delay element 11c between the multiplier 4 and the accumulator 6 is disposed so as to compensate for a driving ability of an output signal of the multiplier 4.

However, when the decision feedback equalizer 14 is actually formed, the update timing of the tap coefficient may delay by influence of the delay elements 12a-12e, 13, a calculation may be performed using old information (tap coefficient before updating), and a convergence accuracy (waveform equalization operation) of a receive signal waveform may be deteriorated. As a result, following characteristics of the decision feedback equalizer 14 may be deteriorated when characteristics of a communication channel change.

SUMMARY

It is an object of the present disclosure to provide a decision feedback equalizer that has a structure in consideration of a formation of an integrated circuit without deteriorating a waveform equalization operation.

A decision feedback equalizer according to an aspect of the present disclosure includes a plurality of weighting devices on a feed forward side, a plurality of weighting devices on a feedback side, an adder, a detector, a subtractor, and a tap coefficient updating portion. Each of the weighting devices on the feed forward side weights an input signal by multiplying the input signal by a tap coefficient directly or through one or more delay elements. Each of the weighting devices on the feedback side weights an output signal by multiplying the output signal by a tap coefficient through one or more delay elements. The adder adds all signals passing through the weighting devices. The detector detects a data symbol based on an addition result of the adder and outputs the output signal. The subtractor calculates a difference between an input signal and the output signal of the detector. The tap coefficient updating portion updates the tap coefficient by multiplying a subtraction result of the subtractor by an updating coefficient and outputs an updated tap coefficient to each of the weighing devices.

At least one of the weighting devices that has the tap coefficient an absolute value of which is relatively larger than absolute values of the tap coefficients of the other weighting devices is referred to as a main weighting device. The delay elements are disposed asymmetrically on signal processing paths or updating paths of the tap coefficients of the weighting devices in such a manner that an updating interval of the tap coefficient of the main weighting device is shorter than updating intervals of the tap coefficients of the other weighting devices.

Because the updating interval of the tap coefficient of the main weighting device is set to be shorter than updating intervals of the tap coefficients of the other weighting devices, the tap coefficient of the main weighting device can be updated without delay, and an expected waveform equalization operation can be achieved. Thus, the decision feedback equalizer can have a configuration considering a formation of an integrated circuit without deteriorating the waveform equalization operation.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
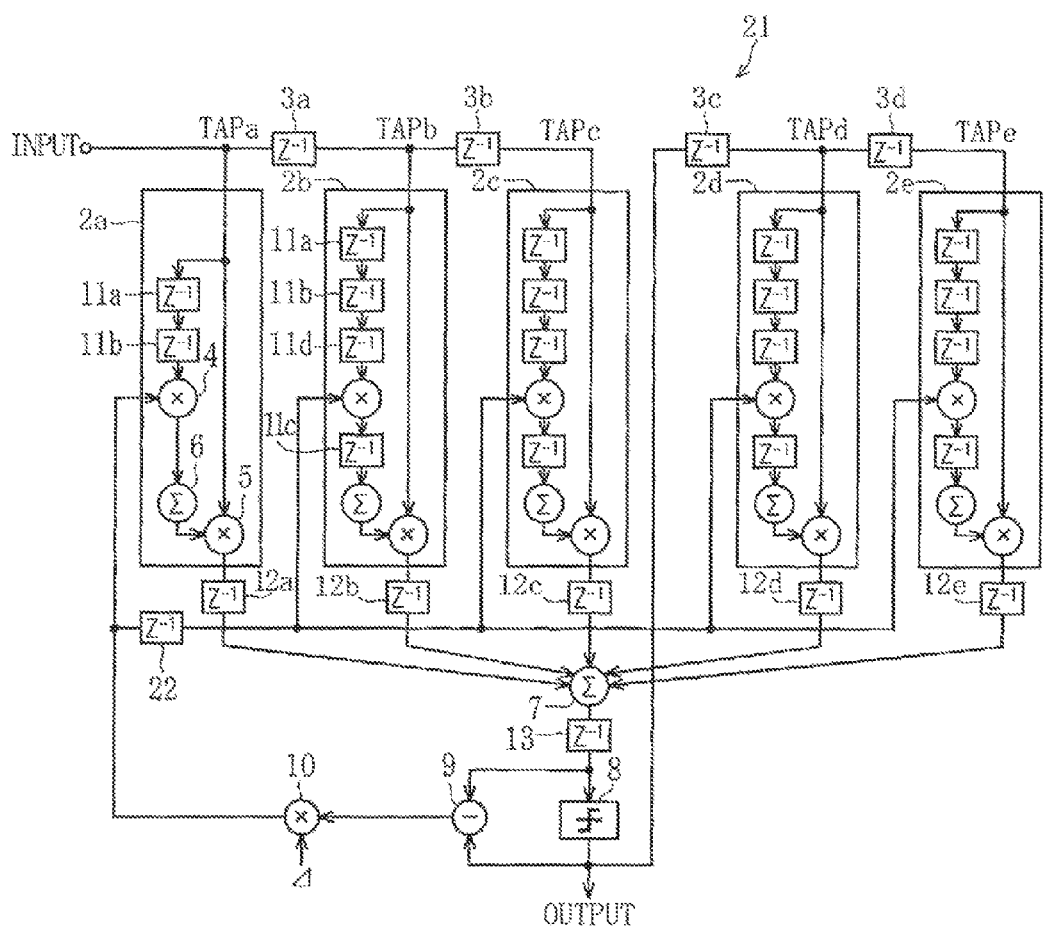
FIG. 1 is a functional block diagram illustrating a decision feedback equalizer according to a first embodiment.

Before describing embodiments of the present disclosure, various aspects of the present disclosure will be described below.

According to an aspect of the present disclosure, delay elements are disposed asymmetrically on signal processing paths or updating paths of tap coefficients of weighting devices in such a manner that an updating interval of a tap coefficient of a weighting device, the absolute value of which is relatively larger in a plurality of FF side weighting devices and a plurality of FB side weighting devices when a waveform equalization operation of a reception signal is optimized, becomes shorter than updating intervals of tap coefficients of the other weighting devices. In the present disclosure, "the signal processing paths or the updating paths of the tap coefficients" means "the signal processing path, the updating paths of the tap coefficients, or both of the signal processing paths and the updating paths of the tap coefficients".

When the decision feedback equalizer actually operates, the tap coefficient of each of the weighting devices depends on a reception signal waveform that actually passes through a signal path (channel). The more important role the weighting device plays in the waveform equalization operation, the larger the absolute value of the tap coefficient becomes.

For example, when a reception signal waveform is input to a simulator of a decision feedback equalizer in which characteristics of an actually-used signal paths are simulated and the waveform equalization operation is performed, one or more main weighting devices, the absolute value of whose tap coefficients are relatively large, can be specified. Then, when an updating interval of the tap coefficient of the main weighting device is set to be shorter than updating intervals of the tap coefficients of the other weighting devices, the tap coefficient of the main weighting device can be updated without delay, and an expected waveform equalization operation can be achieved. Thus, the decision feedback equalizer can have a configuration considering a formation of an integrated circuit without deteriorating the waveform equalization operation.

The delay elements may be disposed asymmetrically in such a manner that a delay time of a signal path from an input terminal to a first multiplier in the main weighting device becomes shorter than signal paths from input terminals to first multipliers in the other weighting devices and an updating path from a tap coefficient updating portion to the first multiplier in the main weighting device becomes shorter than updating paths from the tap coefficient updating portion to the first multipliers in the other weighting devices. Accordingly, the updating interval of the tap coefficient of the main weighting device becomes shorter than the updating intervals of the tap coefficients of the other weighting devices.

When there is a weighting device in which multiple delay elements are connected in series on the signal path from the input terminal to the first multiplier and an output terminal of the delay element disposed in the midway of the series-connected delay elements is connected to the input terminal of another weighting device, a difference can be provided to the delay times given to the weighting devices. Accordingly, the number of delay elements required for providing the difference between the updating intervals of the tap coefficients can be reduced.

In addition, when the delay element disposed between input signal or the output signal and a part of the weighting devices is commonly used as the delay element disposed on the signal path to the first multiplier, the required number of delay elements can be further reduced.

First Embodiment

Figure 2A:
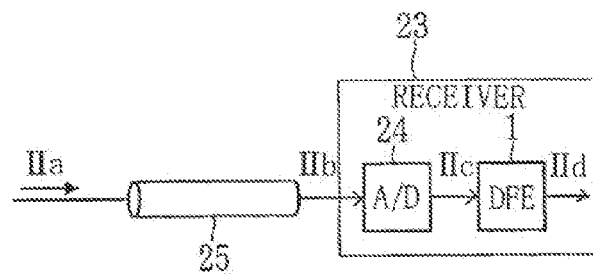
FIG. 2A is a diagram illustrating an outline of a simulation performed to the decision feedback equalizer.
Figure 2B:
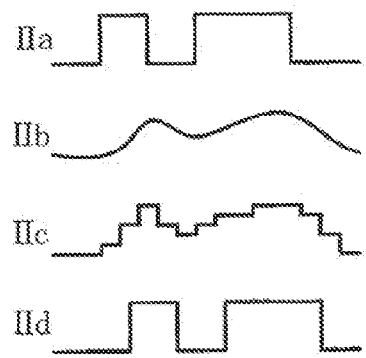
FIG. 2B is a diagram illustrating an example of a simulation result.

Hereinafter, the same parts as the prior art are denoted by the same reference signs and a description will be omitted, and different parts will be mainly described. As illustrated in FIG. 2A, a receiver 23 used in a simulation has a configuration in which an A/D converter 24 is disposed on an input side of the decision feedback equalizer (DFE) 1. On an output side of the decision feedback equalizer 1, for example, a demodulator, which is not shown, is disposed. The A/D converter 24 receives a signal IIa through a cable model 25 that simulates an actual reception signal path. When the signal IIa passes through the cable model 25, a waveform weakens, and the signal IIa changes into a signal IIb illustrated in FIG. 2B. The A/D converter 24 converts the analog signal IIb into a digital signal IIc. When the decision feedback equalizer 1 performs a waveform equalization operation, the signal IIc changes into a signal IId.

Figure 3:
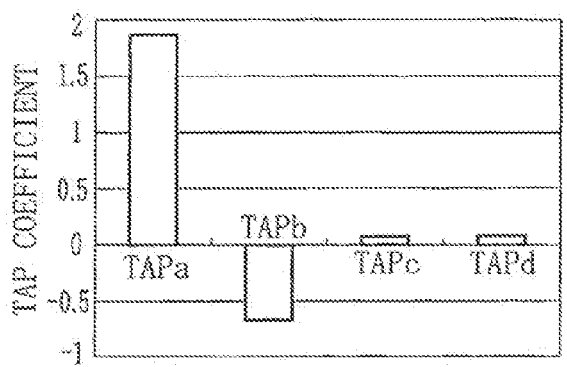
FIG. 3 is a diagram illustrating an example of tap coefficients changed by the simulation in FIG. 2A.

As a result of the waveform equalization operation by the decision feedback equalizer 1, tap coefficients of taps a-d (weighting devices 2a-2c) have values shown in FIG. 3. In the present case, because the absolute value of the coefficient of the tap a becomes the maximum, the weighting device 2a is set as a main weighting device. Because it is a relative evaluation, in some cases, not only the weighting device 2a, but also the weighting device 2b may be set as a main weighting device.

As illustrated in FIG. 1, in a decision feedback equalizer 21 according to a first embodiment, a delay element 11c disposed on an input side (signal processing path) of a multiplier 5 (second multiplier) is omitted in the weighting device 2a. In addition, a delay element 22 is added to an updating path of the tap coefficients from the tap coefficient updating portion 10 to multipliers 4 (first multipliers) in the other weighting devices 2b-2e.

Furthermore, delay elements 11d are added to the input side (signal processing path) of the multipliers 4 in the weighting devices 2b-2e. Accordingly, an updating interval of the tap coefficient of the weighting device 2a is shorter than the updating intervals of the tap coefficients of the other weighting devices 2b-2e by one delay time unit. For example, in a case where a frequency of a reception signal is 50 MHz, an updating coefficient A in the tap coefficient updating portion 10 is set to 20 ns, which corresponds to one period, and delay times of the delay elements 11a-11d are also set to 20 ns.

According to the present embodiment, the absolute value of the tap coefficient of the weighting device 2a is relatively larger than the absolute values of the tap coefficients of the other weighting devices 2b-2e when the waveform equalization operation is optimized, and the delay elements 11a-11d, 12a-12e, 22 are disposed asymmetrically on the signal processing paths and the updating paths of the tap coefficients of the weighting devices 2a-2e in such a manner that the updating interval of the tap coefficient of the weighting device 2a is shorter than the updating intervals of the tap coefficients of the other weighting devices 2b-2e. Thus, the decision feedback equalizer 21 can have a configuration considering a formation of an integrated circuit without deteriorating the waveform equalization operation.

Specifically, the delay time of the signal path from an input terminal to the multiplier 4 in the main weighting devices 2a is set to be shorter than the delay times of the signals paths from input terminals to the multipliers 4 in the other weighting devices 2b-2e, and the updating path from the tap coefficient updating portion 10 to the multiplier 4 in the main weighting device 2a is set to be shorter than the delay times of the updating paths from the tap coefficient updating portion 10 to the multipliers 4 in the other weighting devices 2b-2e. Accordingly, the updating interval of the tap coefficient of the main weighting device 2a becomes shorter than the updating intervals of the tap coefficients of the other weighting devices 2b-2e, and the tap coefficient of the weighting device 2a can be updated to an appropriate value. Thus, the waveform equalization operation performance of the decision feedback equalizer 21 can be secured.

Second Embodiment

Figure 4:
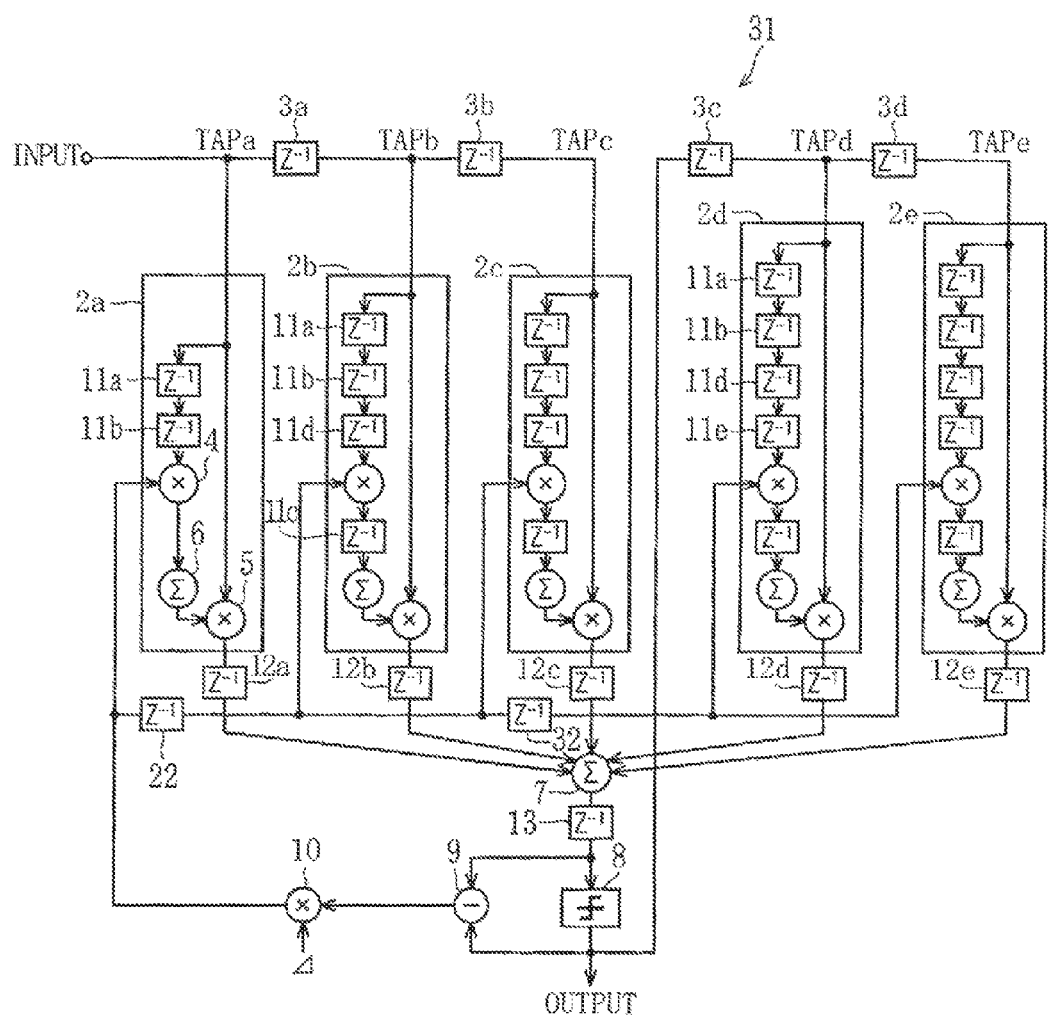
FIG. 4 is a functional block diagram illustrating a decision feedback equalizer according to a second embodiment.

As illustrated in FIG. 4, in a decision feedback equalizer 31 according to a second embodiment, a delay element 32 is added on the updating path of the tap coefficient from an output of the delay element 22 to the weighting devices 2d, 2e. In addition, delay elements 11e are added on the input side of the multipliers 4 in the weighting devices 2d, 2e. Accordingly, the updating intervals of the tap coefficients of the weighting devices 2d, 2e become longer than the updating intervals of the tap coefficients of the weighting devices 2b, 2c by one delay time unit.

The above-described configuration is on assumption that when the absolute value of the tap coefficients in the waveform equalization operation are relatively evaluated by "large, medium, small", the tap coefficients can be classified as follows.

(tap a: large)>(taps b, c: medium)>(taps d, e: small)

According to the second embodiment, the delay element 32 is further added on the updating path after passing through the delay element 22 that is disposed for increasing the delay time of the updating path to the multipliers 4 in the weighting devices 2b, 2c, and the delay elements 11e are added on the signal path from the input terminals to the multipliers 4 in the weighting devices 2d, 2e to which the tap coefficient is input through the delay element 32. Thus, when the magnitude of the absolute values of the tap coefficients can be relatively classified into "large, medium, small," differences can be provided in the updating intervals of the tap coefficients.

Third Embodiment

Figure 5:
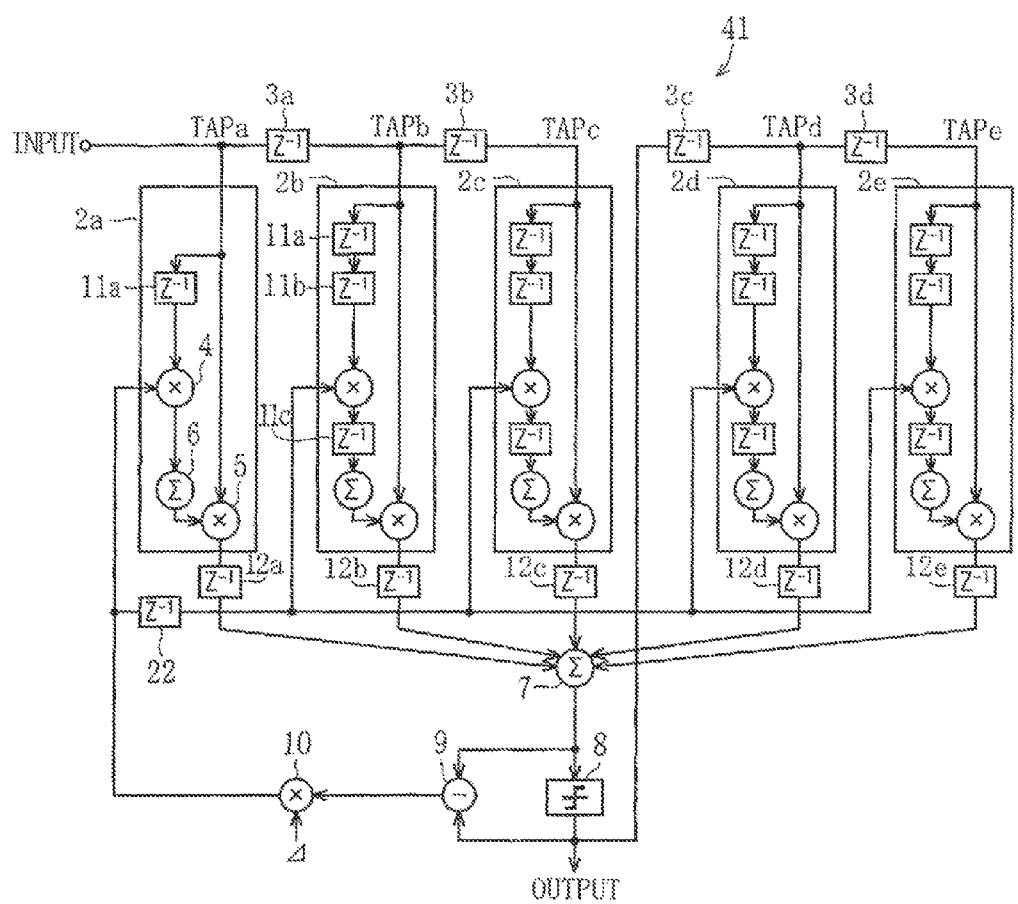
FIG. 5 is a functional block diagram illustrating a decision feedback equalizer according to a third embodiment.

As illustrated in FIG. 5, a decision feedback equalizer 41 according to a third embodiment is different from the decision feedback equalizer 21 according to the first embodiment in that the delay element 13, the delay element 11b in the weighting device 2a, and the delay elements 11d in the weighting device 2b-2e are removed. Instead of removing the delay element 13, the delay element 12a-12b may be removed. The delay elements are disposed considering timing or a driving ability required for signals transmitted between the elements, and removable delay elements may be removed.

Fourth Embodiment

Figure 6:
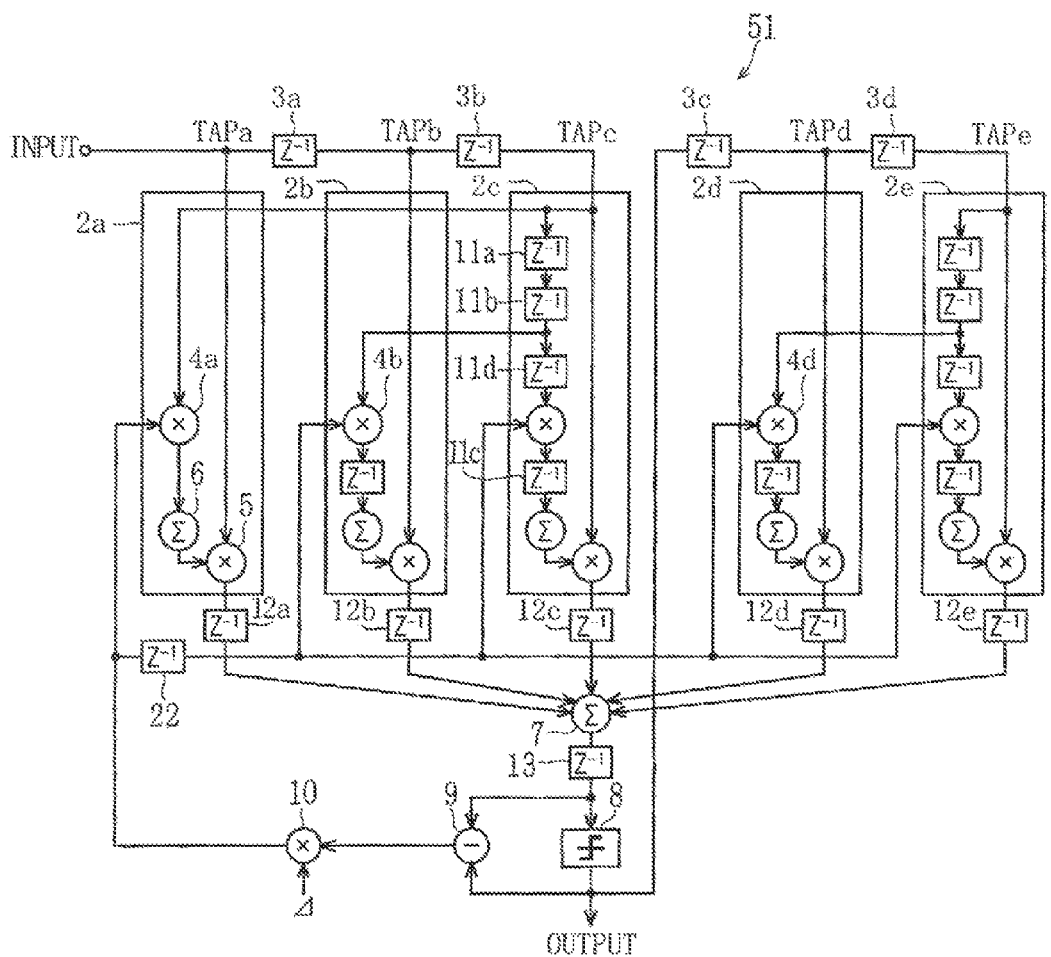
FIG. 6 is a functional block diagram illustrating a decision feedback equalizer according to a fourth embodiment.
Figure 7:
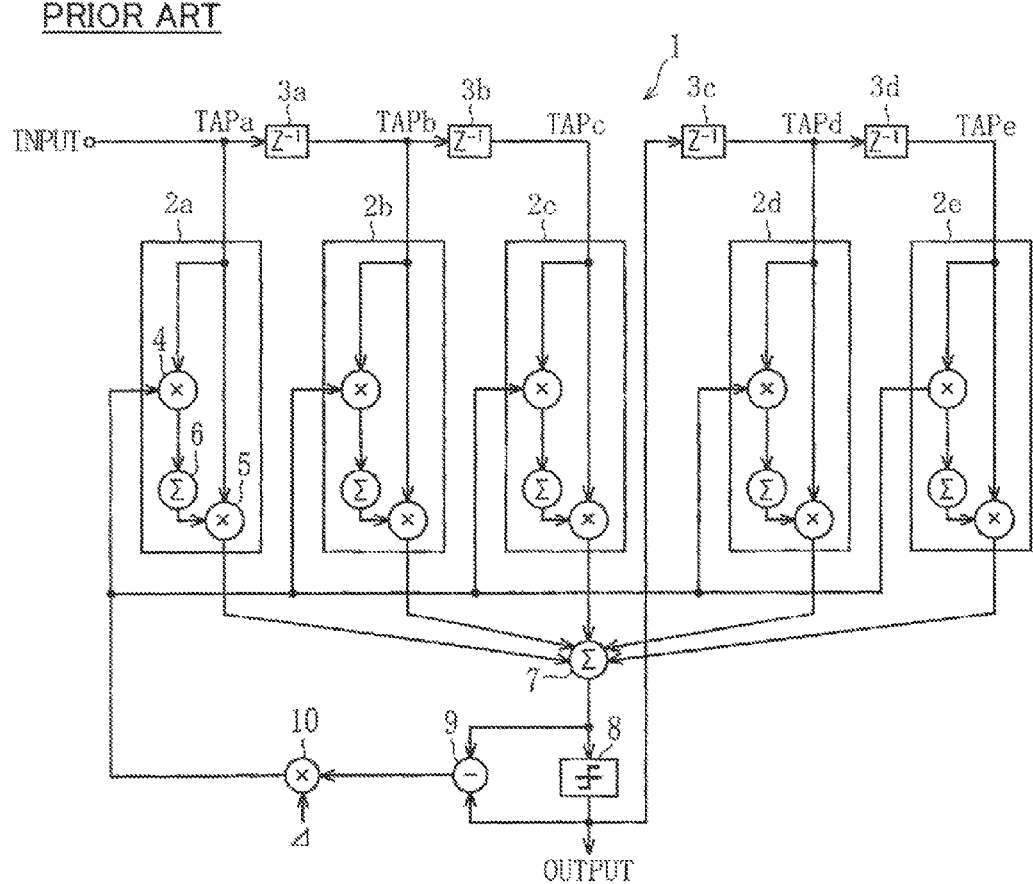
FIG. 7 is a functional block diagram illustrating a decision feedback equalizer according to a prior art.
Figure 8:
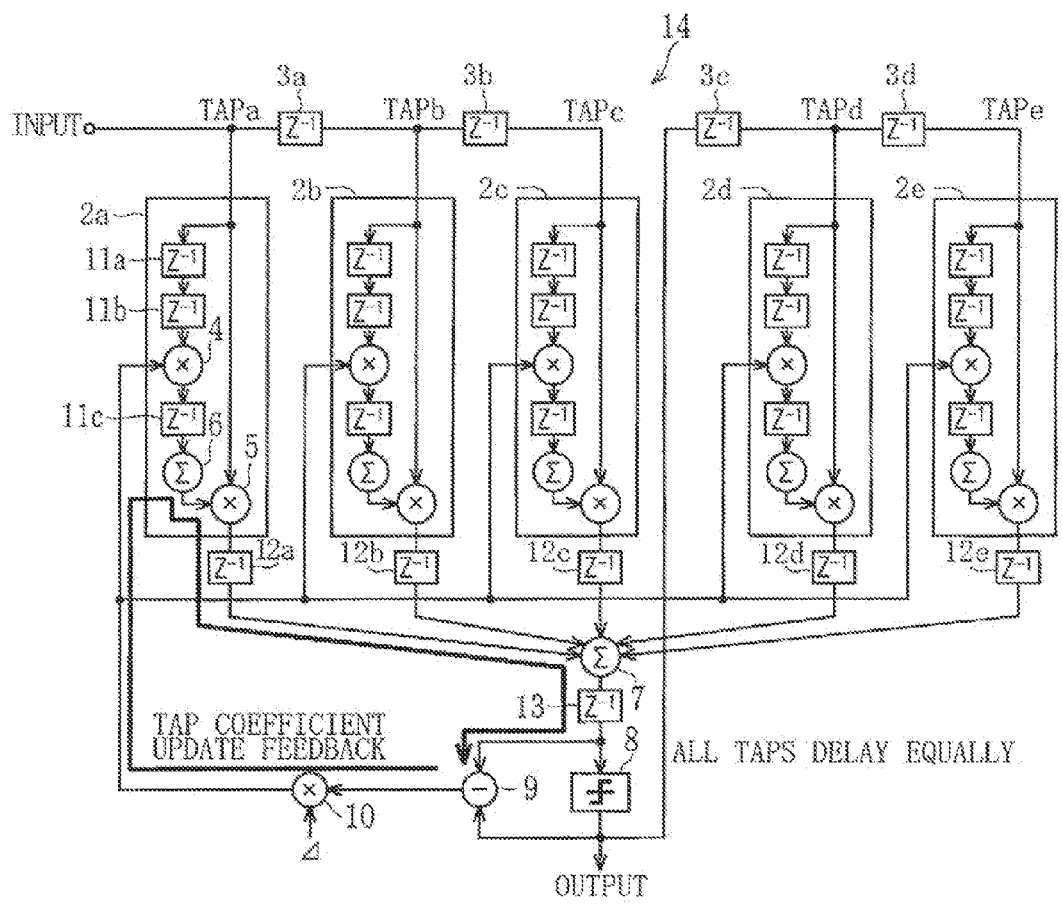
FIG. 8 is a diagram illustrating an example in which a decision feedback equalizer is assumed to be formed into an integrated circuit.

As illustrated in FIG. 6, a decision feedback equalizer 51 according to a fourth embodiment is different from the decision feedback equalizer 21 according to the first embodiment in that the delay elements 11a, 11b in the weighting device 2a and the delay elements 11a, 11b, 11d in the weighting devices 2b, 2d are removed. An Input terminal of a multiplier 4a in the weighting device 2a is connected to an output terminal of the delay element 3b, and an input terminal of a multiplier 4b in the weighting device 2b is connected to an output terminal of the delay element 11b in the weighting device 2c. In addition, an input terminal of a multiplier 4d in the weighting device 2d on the feedback side is connected to an output terminal of the delay element 11b in the weighting device 2e.

In the fourth embodiment, the delay elements disposed on the input side of the multiplier 4a are commonly used as the delay elements 3a, 3b (the delay unit number is 2), and the delay elements disposed on the input side of the multiplier 4b are commonly used as the delay element 3b and the delay elements 11a, 11 b in the weighting device 2c (the delay unit number is 3). In addition, the delay elements disposed on the input side of the multiplier 4d are commonly used as the delay element 3d and the delay elements 11a, 11b in the weighting device 2e (the delay unit number is 3). Thus, the number of delay elements required for providing the difference between the updating intervals of the tap coefficients can be further reduced.

The present disclosure is not limited only to the embodiments described above or described in the drawings, and the following modification or expansion are possible.

The number of taps and the number of delay elements may be optionally set based on a design. For example, in the second embodiment, the delay element may be further added so as to provide a difference between delay times of the updating path between the taps d, e.

It is needless to say that the main weighting device is not limited to the weighting device 2a. In a case where the absolute value of the weighting device 2b or 2c is larger, the weighting device 2b or 2c may be set as the main weighting device. The number of weighting device is not limited to one, and a group of weighting devices having the tap coefficients, the absolute value of which are larger than the others, may be set as main weighting devices.

The delay elements may be disposed asymmetrically only on the signal processing paths of the weighting devices 2a-2e or only on the updating paths of the tap coefficients. The delay time given by the updating coefficient A and the delay elements does not need to be a time corresponding to one period of the reception signal frequency, and the delay time may be set optionally. The second to fourth embodiments may be combined optionally. The detector may output an RZ signal.

What is claimed is:

1. A decision feedback equalizer comprising:
   a plurality of weighting devices on a feed forward side each of which weights an input signal by multiplying the input signal by a tap coefficient directly or through one or more delay elements;
   a plurality of weighting devices on a feedback side each of which weights an output signal by multiplying the output signal by a tap coefficient through one or more delay elements;
   an adder adding all signals passing through the weighting devices;
   a detector detecting a data symbol based on an addition result of the adder and outputting the output signal;
   a subtractor calculating a difference between an input signal and the output signal of the detector; and
   a tap coefficient updating portion updating the tap coefficient by multiplying a subtraction result of the subtractor by an updating coefficient and outputting an updated tap coefficient to each of the weighing devices, wherein
   at least one of the weighting devices that has the tap coefficient an absolute value of which is relatively larger than absolute values of the tap coefficients of the other weighting devices is referred to as a main weighting device, and
   the delay elements are disposed asymmetrically on signal processing paths or updating paths of the tap coefficients of the weighting devices in such a manner that an updating interval of the tap coefficient of the main weighting device is shorter than updating intervals of the tap coefficients of the other weighting devices.

2. The decision feedback equalizer according to claim 1, wherein
   each of the weighting devices includes a first multiplier, an accumulator, and a second multiplier,
   the first multiplier multiplies the input signal by the tap coefficient,
   the accumulator accumulates a multiplication result of the first multiplier,
   the second multiplier multiplies the input signal by an accumulation result of the accumulator, and
   the delay elements are disposed asymmetrically in such a manner that a delay time of a signal path from an input terminal to the first multiplier in the main weighting device is shorter than delay times of signal paths from input terminals to the first multipliers in the other weighting devices and a delay time of the updating path from the tap coefficient updating portion to the first multiplier in the main weighting device is shorter than delay times of the updating paths from the tap coefficient updating portion to the first multipliers in the other weighting devices.

3. The decision feedback equalizer according to claim 2, further comprising
   a first additional delay element disposed on the updating path after passing through the delay element that is disposed for increasing the delay time of the updating path from the tap coefficient updating portion to the first multipliers in the other weighting devices, and
   a second additional delay element disposed on the signal path from the input terminal to the first multiplier in the weighting device to which the tap coefficient is input through the first additional delay element, wherein
   the number of the first additional delay element is equal to the number of the second additional delay element.

4. The decision feedback equalizer according to claim 2, wherein
   two or more of the delay elements are serially connected on the signal path from the input terminal to the first multiplier in one of the weighting devices, and
   an output terminal of the delay element in midway of the serially-connected delay elements is connected to the input terminal of another of the weighting devices to provide a difference between the delay times of the weighting devices.

5. The decision feedback equalizer according to claim 4, wherein
   the delay element disposed between the input signal or the output signal and a part of the weighting devices is commonly used as the delay element disposed on the signal path to the first multiplier.

* * * * *